(12) United States Patent
Lee et al.

(10) Patent No.: US 10,511,056 B2
(45) Date of Patent: Dec. 17, 2019

(54) SOLID POLYMER ELECTROLYTE AND LITHIUM SECONDARY BATTERY COMPRISING SAME

(71) Applicant: LG CHEM, LTD., Seoul (KR)

(72) Inventors: Yeonju Lee, Daejeon (KR); Jonghyun Chae, Daejeon (KR); Daeil Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 16/301,815

(22) PCT Filed: Feb. 27, 2018

(86) PCT No.: PCT/KR2018/002407
§ 371 (c)(1),
(2) Date: Nov. 15, 2018

(87) PCT Pub. No.: WO2018/164407
PCT Pub. Date: Sep. 13, 2018

(65) Prior Publication Data
US 2019/0067739 A1    Feb. 28, 2019

(30) Foreign Application Priority Data

Mar. 9, 2017 (KR) .................. 10-2017-0030006

(51) Int. Cl.
| | | |
|---|---|---|
| *H01M 10/0565* | (2010.01) | |
| *H01M 10/0525* | (2010.01) | |
| *C08F 220/70* | (2006.01) | |
| *C08F 220/22* | (2006.01) | |
| *H01M 4/525* | (2010.01) | |
| *H01B 1/12* | (2006.01) | |
| *C08F 220/30* | (2006.01) | |

(52) U.S. Cl.
CPC ....... *H01M 10/0565* (2013.01); *C08F 220/22* (2013.01); *C08F 220/30* (2013.01); *C08F 220/70* (2013.01); *H01B 1/122* (2013.01); *H01M 4/525* (2013.01); *H01M 10/0525* (2013.01); *H01M 2300/0082* (2013.01)

(58) Field of Classification Search
None
See application file for complete search history.

(56) References Cited

U.S. PATENT DOCUMENTS

| 5,219,679 A | 6/1993 | Abraham et al. |
|---|---|---|
| 5,237,031 A | 8/1993 | Kubota et al. |
| 2014/0058045 A1 | 2/2014 | Hermel-Davidock et al. |

(Continued)

FOREIGN PATENT DOCUMENTS

| EP | 1 729 365 A1 | 12/2006 | |
|---|---|---|---|
| EP | 1729365 A1 * | 12/2006 | ........ H01M 10/0525 |

(Continued)

OTHER PUBLICATIONS

Machine translation of KR 2015-0026717A. (Year: 2015).*

(Continued)

*Primary Examiner* — Catherine S Branch
(74) *Attorney, Agent, or Firm* — Birch, Stewart, Kolasch & Birch, LLP

(57) ABSTRACT

A solid polymer electrolyte having high mechanical strength and ion conductivity, and a lithium secondary battery including the same.

15 Claims, 1 Drawing Sheet

(56) References Cited

U.S. PATENT DOCUMENTS

| | | |
|---|---|---|
| 2015/0010848 A1 | 1/2015 | Suzuki et al. |
| 2015/0288027 A1 | 10/2015 | Lee et al. |

FOREIGN PATENT DOCUMENTS

| | | | | |
|---|---|---|---|---|
| JP | 3-236104 A | 10/1991 | | |
| JP | 03236104 A * | 10/1991 | ............... | H01B 1/06 |
| JP | 6-329793 A | 11/1994 | | |
| JP | 2002-208437 A | 7/2002 | | |
| JP | 2006-86101 A | 3/2006 | | |
| JP | 2015-529728 A | 10/2015 | | |
| JP | 2016-170992 A | 9/2016 | | |
| KR | 10-1998-084657 A | 12/1998 | | |
| KR | 10-2001-0060179 A | 7/2001 | | |
| KR | 20150026717 A * | 3/2015 | | |
| KR | 10-2015-0116737 A | 10/2015 | | |
| WO | WO 2013/136762 A1 | 9/2013 | | |
| WO | WO-2013136762 A1 * | 9/2013 | .......... | H01M 8/1023 |

OTHER PUBLICATIONS

Berlinova et al., "Amphiphilic Graft Copolymers with Poly (oxyethlene) Side Chains: Synthesis via Activated Ester Intermediates-Properties", Journal of Polymer Science: Part A: Polymer Chemistry 1994, vol. 32, pp. 1523-1530.

Das et al., "Activated Ester Containing Polymers: Opportunities and Challenges for the Design of Functional Macromolecules", Chem. Rev., 2016, vol. 116, pp. 1434-1495. See p. 1438, 2. 1 .2 pentafluorophenyl (PFP) ester monomers; and formula 5.

Eberhardt et al., "Syntesis of Pentafluorophenyl(meth)acrylate Polymers: New Precursor Polymers for the Synthesis of Multifunctional Materials", European Polymer Journal, 2005, vol. 41, pp. 1569-1575. See formula 1.

International Search Report (PCT/ISA/210) issued in PCT/KR2018/002407, dated Jun. 28, 2018.

* cited by examiner

【Figure 1】
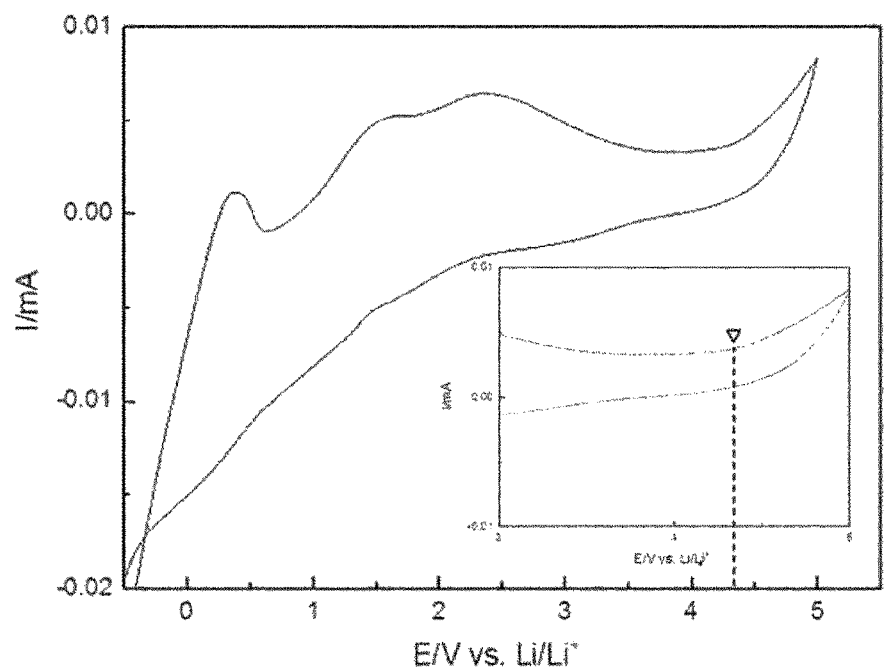
【Figure 2】
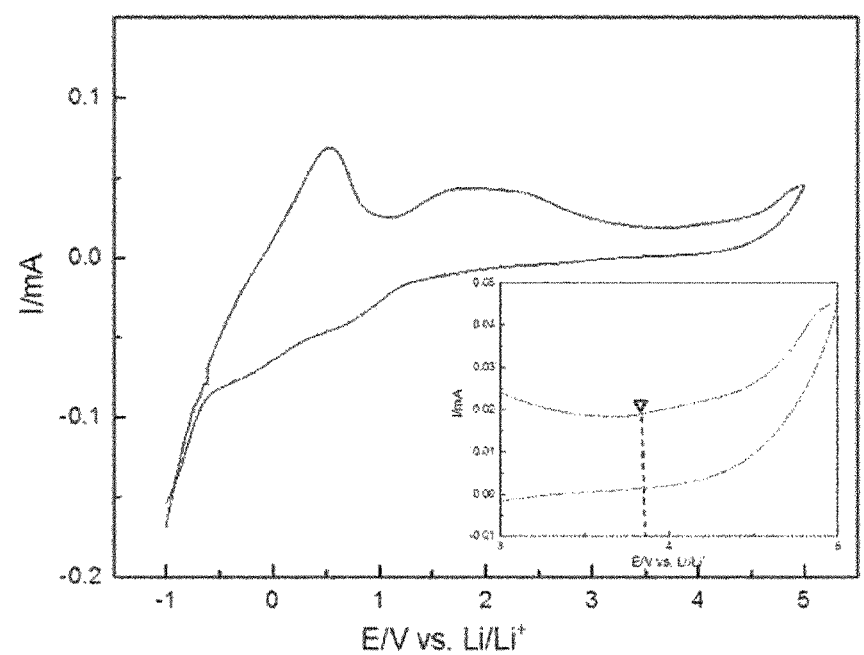

SOLID POLYMER ELECTROLYTE AND LITHIUM SECONDARY BATTERY COMPRISING SAME

TECHNICAL FIELD

This application claims priority to and the benefits of Korean Patent Application No. 10-2017-0030006, filed with the Korean Intellectual Property Office on Mar. 9, 2017, the entire contents of which are incorporated herein by reference.

The present invention relates to a solid polymer electrolyte and a secondary battery including the same.

BACKGROUND ART

A lithium secondary battery is generally manufactured using a positive electrode and a negative electrode including electrode active materials capable of intercalating/deintercalating lithium ions, and an electrolyte that is a transferring medium of the lithium ions.

As the electrolyte, a liquid state electrolyte, particularly, an ion conductive organic liquid electrolyte dissolving a salt in a non-aqueous organic solvent has been normally used in the art. However, such a liquid electrolyte has a possibility of leakage during operation, and has a disadvantage of causing ignition, explosion and the like due to high flammability of the non-aqueous organic solvent used.

Accordingly, in order to overcome a stability problem of a liquid electrolyte, a lithium secondary battery using a gel polymer electrolyte preventing leakage of an electrolyte liquid by containing an electrolyte liquid and a salt in a polymer or a solid polymer electrolyte formed only with a polymer and a salt has recently received attention.

As the polymer used in the solid polymer electrolyte, polyvinylidene fluoride (PVDF) series, polyacrylonitrile (PAN) series, polyethylene oxide (PEO) series, polymethyl methacrylate (PMMA) series, mixtures thereof or copolymers thereof may be included.

Meanwhile, when a low molecular weight polyethylene oxide polymer is used in preparing the solid polymer electrolyte, high ion conductivity (o) may be obtained at room temperature, however, there is a disadvantage of liquidization by the polymer being present with a salt. As a result, the use of high molecular weight polyethylene oxide has been required when preparing the solid polymer electrolyte.

However, using high molecular weight polyethylene oxide has a disadvantage in that ion conductivity decreases to $10^{-5}$ S/cm at room temperature while ion conductivity is relatively high of $10^{-4}$ S/cm at a high temperature of 60° C. or higher. In other words, lithium ion migration in the solid polymer electrolyte occurs by a segmentation movement of a polymer, and in the high molecular weight polyethylene oxide, such a movement is restricted due to high crystallinity causing a decrease in the ion conductivity.

In view of the above, development of a solid polymer electrolyte capable of obtaining both high ion conductivity and mechanical strength in a wide temperature range by suppressing crystallinity when using polyethylene oxide has been required.

PRIOR ART DOCUMENTS (Patent Document 1) Japanese Patent Application Laid-Open Publication No. 2015-529728
(Patent Document 2) U.S. Pat. No. 5,219,679

DISCLOSURE

Technical Problem

A first technological aspect of the present invention provides a solid polymer electrolyte having improved ion conductivity and mechanical properties.

In addition, a second technological aspect of the present invention provides a lithium secondary battery having enhanced electrochemical safety by including the solid polymer electrolyte.

Technical Solution

In view of the above, according to an aspect of the present invention, there is provided a solid polymer electrolyte including a polymer including a first repeating unit represented by the following Chemical Formula 1.

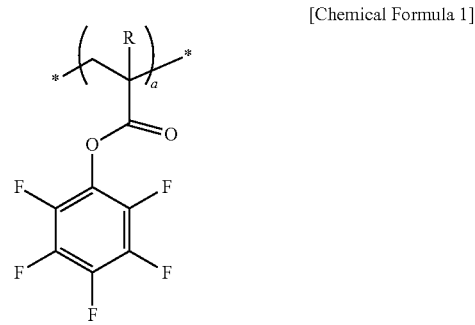

[Chemical Formula 1]

In Chemical Formula 1,
R is hydrogen or an alkyl group having 1 to 3 carbon atoms, and
a is an integer of any one of 1 to 800.

The polymer of the present invention may further include at least one or more repeating units of a second repeating unit represented by the following Chemical Formula 2a and a third repeating unit represented by the following Chemical Formula 2b.

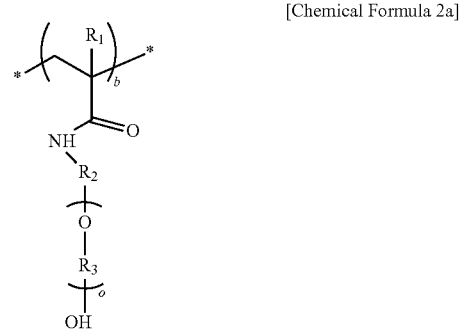

[Chemical Formula 2a]

In Chemical Formula 2a,
$R_1$ is hydrogen or an alkyl group having 1 to 3 carbon atoms, $R_2$ and $R_3$ are each independently an alkylene group having 1 to 3 carbon atoms, b is an integer of any one of 1 to 800, and o is an integer of any one of 10 to 100.

[Chemical Formula 2b]

In Chemical Formula 2b, $R_4$ is hydrogen or an alkyl group having 1 to 3 carbon atoms, $R_5$ to $R_3$ are each independently an alkylene group having 1 to 3 carbon atoms, c is an integer of any one of 1 to 800, and $o_1$ to $o_4$ are each independently an integer of any one of 1 to 120.

Herein, in Chemical Formula 2a and Chemical Formula 2b, b and c are each independently an integer of any one of 50 to 300, and or to 04 are each independently an integer of any one of 10 to 100.

The polymer for the solid polymer electrolyte may have a weight average molecular weight (Mw) of 250 to 4,000,000, specifically 40,000 to 3,000,000, and more specifically 60,000 to 500,000.

In addition, the solid polymer electrolyte may further include a lithium salt.

The lithium salt may be included in 10% by weight to 50% by weight based on a total weight of the solid polymer electrolyte.

Ion conductivity (a) of such a solid polymer electrolyte of the present invention may be from $5\times10^{-5}$ S/cm to $5\times10^{-4}$ S/cm at room temperature, that is, in a temperature range of 25° C. to 40° C.

According to another aspect of the present invention, there is provided a lithium secondary battery including a positive electrode, a negative electrode, and the solid polymer electrolyte of the present invention provided between the positive electrode and the negative electrode.

The lithium secondary battery may further include a separator.

Advantageous Effects

A solid polymer electrolyte according to one embodiment of the present invention is capable of securing high mechanical strength by including a polymer having a phenyl group introduced to a side chain. Moreover, by including a polymer having a polyethylene oxide group introduced to a side chain, the solid polymer electrolyte according to one embodiment of the present invention is capable of enhancing ion conductivity at room temperature by lowering crystallinity of the solid polymer electrolyte. Accordingly, a lithium secondary battery having enhanced electrochemical safety can be manufactured using such a solid polymer electrolyte.

DESCRIPTION OF DRAWINGS

FIG. 1 is a graph presenting a cyclic voltammetry analysis result of a solid polymer electrolyte of Example 13 of the present invention.

FIG. 2 is a graph presenting a cyclic voltammetry analysis result of a solid polymer electrolyte of Comparative Example 2.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Meanwhile, in the present invention, "*" means a linked portion between the same or different atoms or ends of a chemical formula unless particularly mentioned.

One embodiment of the present invention provides a solid polymer electrolyte including a polymer including a first repeating unit represented by the following Chemical Formula 1.

[Chemical Formula 1]

In Chemical Formula 1,

R is hydrogen or an alkyl group having 1 to 3 carbon atoms, a is an integer of any one of 1 to 800, preferably 100 to 500.

By including the first repeating unit represented by Chemical Formula 1 having a phenyl group positioned on a side chain, the solid polymer electrolyte of the present invention according to one embodiment is capable of securing higher mechanical strength compared to existing polymers including polyethylene oxide as a main chain.

In the solid polymer electrolyte of the present invention according to one embodiment, the polymer may further include, in addition to the first repeating unit represented by Chemical Formula 1, at least one or more repeating units of a second repeating unit represented by the following Chemical Formula 2a and a third repeating unit represented by Chemical Formula 2b.

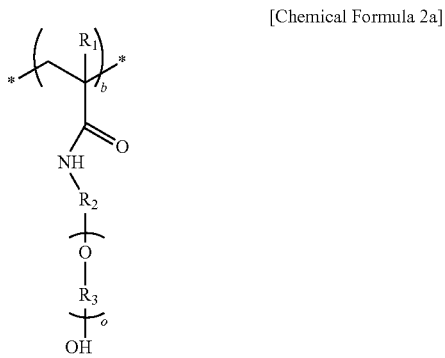

[Chemical Formula 2a]

In Chemical Formula 2a, $R_1$ is hydrogen or an alkyl group having 1 to 3 carbon atoms, $R_2$ and $R_3$ are each independently an alkylene group having 1 to 3 carbon atoms, b is an integer of any one of 1 to 800, preferably 50 to 300, and o is an integer of any one of 1 to 120, preferably 10 to 100.

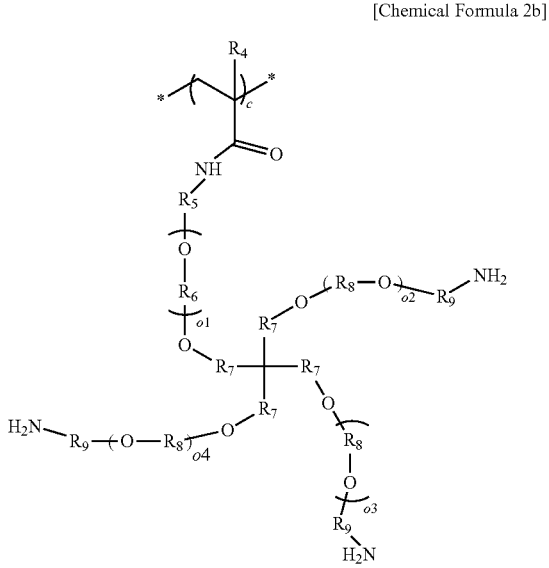

[Chemical Formula 2b]

In Chemical Formula 2b, $R_4$ is hydrogen or an alkyl group having 1 to 3 carbon atoms, $R_5$ to $R_3$ are each independently an alkylene group having 1 to 3 carbon atoms, c is an integer of any one of 1 to 800, preferably 50 to 300, and $o_1$ to $o_4$ are each independently an integer of any one of 1 to 120, preferably 10 to 100.

When b and c representing the number of the repeating units in the polymer of the present invention are present within the above-mentioned range, an effect of enhancing ion conductivity may be obtained. When b and c are less than the above-mentioned range, the effect of enhancing ion conductivity is insignificant, and when b and c are greater than the above-mentioned range, physical strength becomes weak and a film is not formed, and the polymer is liquidized showing flowability as well. In addition, when o is less than 10, the polymer is deformed to a flowing liquid when forming a film, and when o is greater than 100, crystallinity appears leading to an insignificant effect in the ion conductivity increase.

Generally, polymers including elements such as N, O and S coordinate with Li ions and are known to affect ion conductivity. In other words, by including the polymer including the first repeating unit represented by Chemical Formula 1 having a phenyl group introduced to a side chain, the solid polymer electrolyte of the present invention is capable of enhancing ion conductivity and physical strength. In addition, by including a polymer including a second repeating unit represented by Chemical Formula 2a and a third repeating unit represented by Chemical Formula 2b introducing a low molecular weight polyethylene oxide group unusable due to liquidization even though providing a lithium ion conductive path, the solid polymer electrolyte of the present invention is capable of obtaining an effect of preventing liquidization and lowering crystallinity while enhancing ion conductivity.

Meanwhile, the polymer further including the second repeating unit may be prepared by polymerizing the polymer including the first repeating unit represented by Chemical Formula 1 with a compound represented by the following Chemical Formula 5.

The polymerization reaction may be carried out by mixing a compound represented by the following Chemical Formula 5 in 0.1 moles to 0.9 moles with respect to 1 mole of the polymer including the first repeating unit represented by Chemical Formula 1.

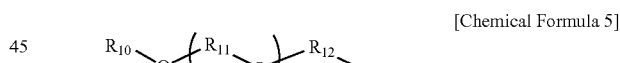

[Chemical Formula 5]

In Chemical Formula 5, $R_{10}$ is hydrogen, $R_{11}$ and $R_{12}$ are each independently an alkylene group having 1 to 3 carbon atoms, and q is an integer of any one of 1 to 120.

The polymer further including the third repeating unit may be prepared by polymerizing the polymer including the first repeating unit represented by Chemical Formula 1 and a compound represented by the following Chemical Formula 6.

Herein, the polymerization reaction may be carried out by mixing a compound represented by the following Chemical Formula 6 in 0.1 moles to 0.9 moles with respect to 1 mole of the polymer including the first repeating unit represented by Chemical Formula 1.

[Chemical Formula 6]

In Chemical Formula 6, $R_{13}$ to $R_{15}$ are each independently an alkylene group having 1 to 3 carbon atoms, and o9 to o12 are each independently an integer of any one of 1 to 120.

In addition, the polymer further including the second repeating unit and the third repeating unit may be prepared by polymerizing the polymer including the first repeating unit represented by Chemical Formula 1, with the compound represented by Chemical Formula 5 and the compound represented by Chemical Formula 6.

Herein, the polymerization reaction may be carried out by mixing the compounds represented by Chemical Formulae 5 and 6 in 0.1 moles to 0.9 moles each with respect to 1 mole of the polymer including the first repeating unit represented by Chemical Formula 1.

The polymer included in the solid polymer electrolyte of the present invention according to one embodiment may have a form of at least one of a random copolymer, a block copolymer, an alternate copolymer or a graft copolymer, and specifically, may include a repeating unit represented by the following Chemical Formula 3a.

[Chemical Formula 3a]

In Chemical Formula 3a, a1 is an integer of any one of 1 to 800, preferably 100 to 500, b1 is an integer of any one of 1 to 800, preferably 150 to 300, and o is an integer of any one of 10 to 100.

In the solid polymer electrolyte of the present invention according to one embodiment, the polymer may include a repeating unit represented by the following Chemical Formula 3b.

[Chemical Formula 3b]

In Chemical Formula 3b, a2 is an integer of any one of 1 to 800, preferably 100 to 500, c1 is an integer of any one of 1 to 800, preferably 50 to 300, and $o_1$ to $o_4$ are each independently an integer of any one of 1 to 120, preferably 10 to 100.

In the solid polymer electrolyte of the present invention according to one embodiment, the polymer may include a repeating unit represented by the following Chemical Formula 3c.

[Chemical Formula 3c]

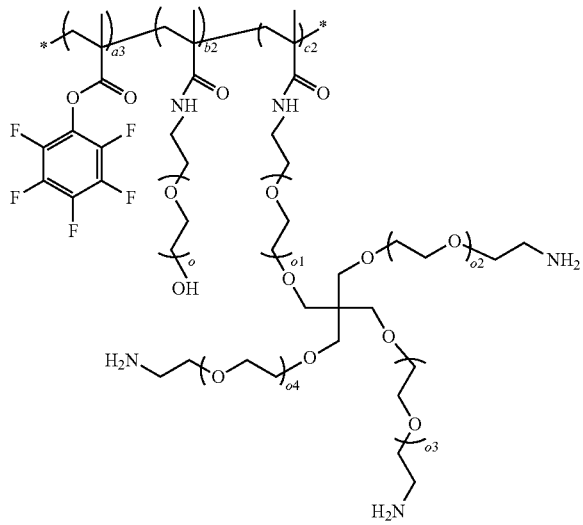

In Chemical Formula 3c,
a3 is an integer of any one of 1 to 800, preferably 100 to 500,
b2 is an integer of any one of 1 to 800, preferably 100 to 500, and
c2 is an integer of any one of 1 to 800, preferably 50 to 300,
o is an integer of any one of 10 to 100, and
$o_1$ to $o_4$ are each independently an integer of any one of 1 to 120, preferably 10 to 100.

In addition, in the solid polymer electrolyte of the present invention, the polymer may further selectively include, in addition to the first to the third repeating units, a fourth repeating unit represented by the following Chemical Formula 4 in order to more enhance ion conductivity. The polymer may preferably include the first repeating unit; at least one or more of the second repeating unit and the third repeating unit; and the fourth repeating unit.

[Chemical Formula 4]

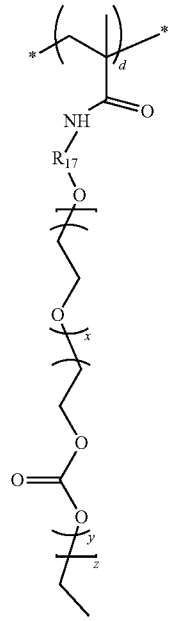

In Chemical Formula 4,
$R_{17}$ is an alkylene group having 1 to 5 carbon atoms,
d is an integer of any one of 1 to 800, preferably 100 to 500,
x and y are each independently an integer of any one of 1 to 120, preferably 10 to 100, and
z is an integer of any one of 1 to 10.

In the solid polymer electrolyte of the present invention according to one embodiment, the polymer may have a weight average molecular weight (MW) of approximately 250 to 4,000,000, specifically 40,000 to 3,000,000, and more specifically 60,000 to 500,000. When the polymer has a weight average molecular weight within the above-mentioned range, the degree of polymerization of the polymer is controlled to a proper range, and as a result, a solid polymer electrolyte having excellent mechanical strength and electrochemical safety may be obtained as well as improving ion conductivity and a lithium cation transference number.

Herein, the weight average molecular weight in the present specification may mean a conversion factor with respect to standard polystyrene measured using gel permeation chromatograph (GPC), and unless particularly defined otherwise, a molecular weight may mean a weight average molecular weight. For example, the measurement is made using a 1200 series of Agilent under a GPC condition in the present invention, and as the column used herein, a PL mixed B column of Agilent may be used, and THF or DMF may be used as the solvent. As for a detector, a refractive index (RI) detector is used.

In addition, the solid polymer electrolyte of the present invention may further include a lithium salt.

As the lithium salt, those commonly used in an electrolyte liquid for a secondary battery may be used without limit, and for example, the lithium salt may include $Li^+$ as a cation, and, as an anion, may include at least any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3$ $(CF_2)_7SO_3^-$, $CF_3CO_2^-$, $CH_3CO_2^-$, $SCN^-$ and $(CF_3CF_2SO_2)_2N^-$. The lithium salt may be used in, as necessary, one type or as a mixture of two or more types.

The lithium salt content may be properly modified within a commonly usable range, however, for obtaining an optimal ion conductivity effect, the lithium salt may be included in 10% by weight to 50% by weight, and specifically in 20% by weight to 50% by weight with respect to the total content of the solid polymer electrolyte.

Ion conductivity (a) of the solid polymer electrolyte of the present invention according to one embodiment may be from $5\times10^{-5}$ S/cm to $5\times10^{-4}$ S/cm at room temperature, that is, in a temperature range of 25° C. to 40° C.

In addition, the solid polymer electrolyte of the present invention may be electrochemically stable in a voltage range of 0 V to 5.5 V, specifically, 0 V to 4.3 V. The solid polymer electrolyte according to one embodiment may be used in an electrochemical device operated at a high voltage by having an electrochemically stable wide voltage window.

The ion conductivity and the voltage safety may be measured using a VMP3 multichannel potentiostat manufactured by Bio-logic Science Instruments after temperature stabilized for 30 minutes in a 25° C. chamber.

A general solid polymer electrolyte formed with low molecular weight polyethylene oxide and a lithium salt in the art has a disadvantage in that film formation is difficult due to liquidization at room temperature when present with a salt, whereas high ion conductivity (o) is obtained at room temperature (25° C.).

On the contrary, by the solid polymer electrolyte of the present invention including, as described above, the polymer including the first repeating unit having a phenyl group introduced to a side chain, and the second and/or the third repeating unit having a low molecular weight polyethylene oxide group unusable due to liquidization introduced to a side chain, the solid polymer electrolyte capable of securing more superior lithium ion conductivity and mechanical properties at room temperature may be prepared.

Meanwhile, the solid polymer electrolyte of the present invention may further contain inorganic particles in a 10% by weight to 25% by weight range with respect to the total weight of the solid polymer electrolyte.

The inorganic particles are impregnated into the solid polymer electrolyte and may allow a high viscosity solvent to favorably permeate through pores formed by empty space between the inorganic particles. In other words, by including the inorganic particles, an effect of more enhancing wettability for high viscosity solvents by affinity between polar materials and a capillary phenomenon.

As such inorganic particles, inorganic particles having a high permittivity and having no oxidation and/or reduction reactions in an operating voltage range (for example, 0 V to 5 V based on Li/Li$^+$) of a lithium secondary battery may be used.

Specifically, typical examples of the inorganic particles may include a single material selected from the group consisting of $BaTiO_3$, $Pb(Zr,Ti)O_3$ (PZT), $Pb_{1-a}La_aZr_{1-b}Ti_bO_3$ (PLZT, herein, $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC having a permittivity constant of 5 or greater and mixtures thereof, or a mixture of two or more types thereof.

In addition to the inorganic particles, inorganic particles having a lithium ion transfer ability, that is, lithium phosphate ($Li_3PO_4$), lithium titanium phosphate ($Li_cTi_d(PO_4)_3$, $0<d<2$, $0<d<3$), lithium aluminum titanium phosphate ($Li_{a1}Al_{b1}Ti_{c1}(PO_4)_3$, $0<a1<2$, $0<b1<1$, $0<c1<3$), $(LiATiP)_{a2}O_{b2}$ series glass ($0<a2<4$, $0<b2<13$) such as $14Li_2O-9Al_2O_3-38TiO_2-39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_{3.25}N$, $SiS_2$ series glass ($Li_{a6}Si_{b6}S_{c3}$, $0<a6<3$, $0<b6<2$, $0<c3<4$) such as $Li_3PO_4$—$Li_2S$—$SiS_2$, $P_2S_5$ series glass ($Li_{a7}P_{b7}S_{c4}$, $0<a7<3$, $0<b7<3$, $0<c4<7$) such as $LiI$—$Li_2S$—$P_2S_5$, mixtures thereof, or the like, may be further included.

An average particle diameter of the inorganic particles is preferably in a range of approximately 0.001 μm to 10 μm so as to form to have proper porosity to a uniform thickness in the solid polymer electrolyte. When the average particle diameter is less than 0.001 μm, dispersibility may decrease, and when the average particle diameter is greater than 10 μm, the thickness of the porous coating layer may increase, and a phenomenon of inorganic particle aggregation occurs as well causing a decrease in the mechanical strength as the particles are exposed outside the solid polymer electrolyte.

The solid polymer electrolyte of the present invention may be used as an electrolyte of a lithium secondary battery such as a lithium sulfur battery, a lithium air battery, a lithium ion battery or a lithium polymer battery.

Moreover, the solid polymer electrolyte of the present invention is useful as a lithium metal protective layer, and therefore, using the solid polymer electrolyte of the present invention may decrease reactivity between a liquid electrolyte and a lithium electrode, and may delay dendritic growth by uniformizing current and ion distribution. Accordingly, durability of a lithium metal secondary battery may be more improved.

In addition, one embodiment of the present invention may provide a lithium secondary battery including the solid polymer electrolyte of the present invention provided between a positive electrode and a negative electrode.

Herein, the solid polymer electrolyte of the present invention described above may be formed in a coating layer form by being coated on the positive electrode or the negative electrode, or may be prepared in a free standing-type layer and inserted between the positive electrode and the negative electrode.

Specifically, the solid polymer electrolyte may be prepared in a layer, film or sheet form having a thickness of 200 μm or less, for example, 0.1 μm to 100 μm, for example, 1 μm to 40 μm. Herein, known technologies such as spin coating, roll coating, curtain coating, extrusion, casting, screen printing or inkjet printing may be used for preparing the solid polymer electrolyte in a sheet, film or layer form.

In addition, as the solid polymer electrolyte of the present invention is disposed on at least part of the negative electrode or the positive electrode, the positive electrode or negative electrode surface may be electrochemically stabilized while being mechanically stabilized. Particularly, the solid polymer electrolyte completely covers the negative electrode or positive electrode surface, and thereby performs a role of a protective layer preventing a direct contact between the negative electrode or positive electrode surface with a highly reactive electrolyte, and may enhance chemical stability. For example, when the solid polymer electrolyte is formed on the negative electrode surface, formation of dendrite on the negative electrode surface may be suppressed when charging and discharging a lithium secondary battery, and interfacial stability between the negative electrode and the electrolyte is enhanced. Accordingly, cycle properties of the lithium secondary battery may be enhanced.

Meanwhile, according to one embodiment of the present invention, the negative electrode or the positive electrode forming the lithium secondary battery may be prepared using common methods known in the art. For example, the positive electrode or the negative electrode may be prepared by mixing a solvent, and as necessary, a binder, a conductor and a dispersant to a positive electrode or negative electrode active material, stirring the result to prepare slurry, and applying (coating) the result on a current collector made of metal material, and extruding and then drying the result.

According to one embodiment of the present invention, the positive electrode active material forming the positive electrode may be used at a general voltage or a high voltage, and compounds capable of reversibly intercalating/deintercalating lithium may be used.

Specifically, the positive electrode active material is a compound capable of reversibly intercalating and deintercalating lithium, and specifically, may include a lithium composite metal oxide including one or more types of metals such as cobalt, manganese, nickel or aluminum, and lithium. More specifically, the lithium composite metal oxide may include lithium-manganese-based oxides (for example, $LiMnO_2$, $LiMn_2O_4$ or the like), lithium-cobalt-based oxides (for example, $LiCoO_2$ or the like), lithium-nickel-based oxides (for example, $LiNiO_2$ or the like), lithium-nickel-manganese-based oxides (for example, LiNi$_{1-y}$Mn$_y$O$_2$ (herein, 0<Y<1), LiMn$_{2-z}$Ni$_z$O$_4$ (herein, 0<Z<2) or the like), lithium-nickel-cobalt-based oxides (for example, LiNi$_{1-y1}$Co$_{y1}$O$_2$ (herein, 0<Y1<1) or the like), lithium-manganese-cobalt-based oxides (for example, LiCo$_{1-y2}$Mn$_{y2}$O$_2$ (herein, 0<Y2<1), LiMn$_{2-z1}$Co$_{z1}$O$_4$ (herein, 0<Z1<2) or the like), lithium-nickel-manganese-cobalt-based oxides (for example, Li(Ni$_p$Co$_q$Mn$_{r1}$)O$_2$ (herein, 0<p<1, 0<q<1, 0<r1<1, p+q+r1=1), Li(Ni$_{p1}$Co$_{q1}$Mn$_{r2}$)O$_4$ (herein, 0<p1<2, 0<q1<2, 0<r2<2, p1+q1+r2=2) or the like), lithium-nickel-cobalt-transition metal (M) oxides (for example, Li(Ni$_{p2}$Co$_{q2}$Mn$_{r3}$M$_{s2}$)O$_2$ (herein, M is selected from the group consisting of Al, Fe, V, Cr, Ti, Ta, Mg and Mo, and p2, q2, r3 and s2 are atomic fractions of each independent elements with 0<p2<1, 0<q2<1, 0<r3<1, 0<s2<1 and p2+q2+r3+s2=1) or the like), or the like, and any one, or two or more compounds among these may be included. Among these, the lithium composite metal oxide may be LiCoO$_2$, LiMnO$_2$, LiNiO$_2$, a lithium nickel manganese cobalt oxide (for example, Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.8}$Mn$_{0.1}$Co$_{0.1}$)O$_2$ or the like), a lithium nickel cobalt aluminum oxide (for example, Li(Ni$_{0.8}$Co$_{0.15}$Al$_{0.05}$)O$_2$ or the like) or the like in terms of enhancing capacity properties and stability of a battery, and when considering the significance of an improving effect depending on the types and content ratio control of component elements forming the lithium composite metal oxide, the lithium composite metal oxide may be Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, L(Ni$_{0.8}$Mn$_{0.1}$Co$_{0.1}$)O$_2$ or the like, and among these, any one or a mixture of two or more may be used.

In addition, according to one embodiment of the present invention, a negative electrode active material forming the negative electrode may commonly use one, two or more types selected from the group consisting of carbon materials such as natural graphite or artificial graphite capable of intercalating and deintercalating lithium ions; metals (Me) that are lithium-containing titanium composite oxides (LTO), Si, Sn, Li, Zn, Mg, Cd, Ce, Ni or Fe; alloys formed with the metals (Me); oxides of the metals (Me); and composites formed with the metals (Me) and carbon. Carbon materials may be preferably used, and as the carbon materials, low crystalline carbon, high crystalline carbon and the like may all be used. Typical examples of the low crystalline carbon may include soft carbon and hard carbon, and typical examples of the high crystalline carbon may include natural graphite, Kish graphite, pyrolytic carbon, mesophase pitch-based carbon fiber, meso-carbon microbeads, mesophase pitches and high temperature baked carbon such as petroleum or coal tar pitch derived cokes.

In addition, as the binder, various types of binder polymers such as a polyvinylidene fluoride-hexafluoropropylene copolymer (PVDF-co-HFP), polyvinylidene fluoride, polyacrylonitrile, polymethyl methacrylate, polyvinyl alcohol, carboxylmethylcellulose (CMC), starch, hydroxypropylcellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, styrene-butadiene rubber (SBR), fluoro rubber or various copolymers may be used. The binder may be commonly included in 1% by weight to 30% by weight based on the total weight of the electrode slurry.

In addition, the conductor is not particularly limited as long as it has conductivity without inducing chemical changes to a battery, and examples thereof may include graphite such as natural graphite or artificial graphite; carbon-based materials such as carbon black, acetylene black, ketjen black, channel black, furnace black, lamp black or thermal black; conductive fibers such as carbon fibers or metal fibers; fluorocarbon, aluminum and metal powders such as nickel powder; conductive whiskers such as zinc oxide and potassium titanate; conductive metal oxides such as titanium oxide; conductive materials such as polyphenylene derivatives, and the like. The conductor may be commonly included in 1% by weight to 30% by weight based on the total weight of the electrode slurry.

In addition, depending on the type of the lithium secondary battery, a separator may be additionally present between the positive electrode and the negative electrode. As such a separator, common porous polymer films, that is, polyethylene, polypropylene, polyvinylidene fluoride or a multi-layer film of two or more layers thereof may be used, and mixed multilayer films such as a polyethylene/polypropylene double layer separator, a polyethylene/polypropylene/polyethylene triple layer separator or a polypropylene/polyethylene/polypropylene triple layer separator may certainly be used. Alternatively, common porous non-woven fabrics, for example, non-woven fabrics made of high melting point glass fiber, polyethylene terephthalate fiber or the like may also be used, however, the separator is not limited thereto.

Appearances of the lithium secondary battery according to one embodiment of the present invention are not particularly limited, but may include a cylinder-type, a square-type, a pouch-type, a coin-type or the like using a can.

Hereinafter, the present invention will be described in detail with reference to examples in order to specifically describe the present invention. However, the examples according to the present invention may be modified to various different forms, and the scope of the present invention is not construed as being limited to the examples described below. The examples of the present invention are provided in order to more fully describe the present invention for those having average knowledge in the art.

EXAMPLE

I. Preparation of Polymer

Example 1

Pentafluorophenyl methacrylate (Sigma Aldrich) was purified by passing through an alumina column.

To 2.5 mL of anhydrous toluene (Sigma Aldrich), 2.5 g of the purified pentafluorophenyl methacrylate and 2.5 mg of 2,2'-azobis(2-methylpropionitrile) that is a polymerization initiator were introduced, and a polymerization reaction was performed for 20 hours at 70° C.

After the reaction was terminated, hexane was introduced to the reaction solution, and then precipitated products were filtered and dried to obtain a polymer including a first repeating unit represented by Chemical Formula 1 (R=methyl, a=90, weight average molecular weight=89,000) (yield 89%).

Example 2

Pentafluorophenyl acrylate (Sigma Aldrich) was purified by passing through an alumina column.

To 2.5 mL of anhydrous toluene (Sigma Aldrich), 2.5 g of the purified pentafluorophenyl acrylate and 2.5 mg of 2,2'-azobis(2-methylpropionitrile) that is a polymerization initiator were introduced, and a polymerization reaction was performed for 20 hours at 70° C.

After the reaction was terminated, hexane was introduced to the reaction solution, and then precipitated products were filtered and dried to obtain a polymer including a first repeating unit represented by Chemical Formula 1 (R=hydrogen, a=89, weight average molecular weight=85,000) (yield 87%).

Example 3

After dissolving 0.1 g of the polymer of Example 1 in 15 mL of anhydrous acetone (Samchun Chemical), 0.15 g of (2-aminoethyl)polyethylene glycol (Sigma Aldrich, weight average molecular weight (Mn)=5,000) and 0.2 mL of triethylamine were introduced thereto, and the result was reacted for 24 hours at 40° C.

After the reaction was terminated, the reaction solution was cooled, and then hexane was introduced thereto to precipitate products. The precipitated products were filtered with MC/hexane and dried to obtain a compound of Chemical Formula 3a (yield 80%, o=11).

Example 4

A polymer of Chemical Formula 3b was prepared in the same manner as in Example 3 except that 0.1 g of 4arm-PEG20K-NH2 (Sigma Aldrich, weight average molecular weight (Mn)=20,000) was used instead of the (2-aminoethyl)polyethylene glycol.

Example 5

A polymer of Chemical Formula 3c was prepared in the same manner as in Example 3 except that 0.1 g of 4arm-PEG20K-NH2 (Sigma Aldrich, weight average molecular weight (Mn)=20,000) was also introduced when introducing 0.15 g of the (2-aminoethyl)polyethylene glycol.

II. Preparation of Polymer Electrolyte

Example 6

A mixed solution was prepared by dissolving 0.1 g of the polymer including the first repeating unit represented by Chemical Formula 1 prepared in Example 1 and 0.021 g of a lithium salt (LiTFSI) in THF.

The mixed solution was coated on a first steel use stainless (SUS) layer capable of being used as a working electrode, and the result was dried at approximately 25° C. to prepare a solid polymer electrolyte. Subsequently, a second SUS layer was covered on the solid polymer electrolyte to prepare a multilayer structure formed with the first SUS layer/polymer electrolyte/second SUS layer, and then the result was heat treated for 15 hours at approximately 40° C. under vacuum atmosphere.

Example 7

A solid polymer electrolyte was prepared in the same manner as in Example 6 except that the lithium salt was used in 0.036 g.

Example 8

A solid polymer electrolyte was prepared in the same manner as in Example 6 except that the lithium salt was used in 0.056 g.

Example 9

A solid polymer electrolyte was prepared in the same manner as in Example 6 except that the lithium salt was used in 0.084 g.

Example 10

A solid polymer electrolyte was prepared in the same manner as in Example 6 except that the polymer of Chemical Formula 3a of Example 3 was used instead of the polymer of Example 1.

Example 11

A solid polymer electrolyte was prepared in the same manner as in Example 6 except that the polymer of Chemical Formula 3b of Example 4 was used instead of the polymer of Example 1.

Example 12

A solid polymer electrolyte was prepared in the same manner as in Example 6 except that the polymer of Chemical Formula 3c of Example 5 was used instead of the polymer of Example 1.

Example 13

A solid polymer electrolyte was prepared in the same manner as in Example 6 except that the second SUS layer was replaced by Li metal.

Example 14

A solid polymer electrolyte was prepared in the same manner as in Example 6 except that the first and the second SUS layers were replaced by Li metal.

Comparative Example 1

A mixed solution was prepared by dissolving 0.5 g of polyethylene oxide (Sigma Aldrich, 1,000,000 g/mol) and 0.36 g of a lithium salt (LiTFSI) in 10 mL of acetonitrile.

The mixed solution was coated on a first steel use stainless (SUS) layer capable of being used as a working electrode, and the result was dried at approximately 25° C. to prepare a solid polymer electrolyte. Subsequently, a second SUS layer was covered on the solid polymer electrolyte to prepare a multilayer structure formed with the first SUS layer/polymer electrolyte/second SUS layer, and then the result was heat treated for 15 hours at approximately 40° C. under vacuum atmosphere.

Comparative Example 2

A solid polymer electrolyte was prepared in the same manner as in Comparative Example 1 except that the second SUS layer was replaced by Li metal.

Comparative Example 3

A solid polymer electrolyte was prepared in the same manner as in Comparative Example 1 except that the first and the second SUS layers were replaced by Li metal.

Experimental Example

Experimental Example 1: Electrochemical Stability

Each of the solid polymer electrolytes prepared in Example 13 and Comparative Example 2 was temperature stabilized for 30 minutes in a 25° C. chamber using a VMP3 multichannel potentiostat of Bio-logic Science Instruments, and then cyclic voltammetry (CV) analyzed to evaluate electrochemical stability. Analysis results on the measured solid polymer electrolytes of Example 13 and Comparative Example 2 are shown in FIGS. 1 and 2.

Herein, the condition of the cyclic voltammetry measurement was as follows:

Voltage range: −1 V to 5 V, scan rate: approximately 5 mV/s

Temperature: 25° C.

When examining FIG. 1, it was identified that the polymer electrolyte of Example 13 had no peak occurrences caused by an oxidation at lower than approximately 4.3 V, and a peak was gradually formed after 4.3 V.

Meanwhile, when examining FIG. 2, it was identified that the polymer electrolyte of Comparative Example 2 had a primary oxidation peak caused by an oxidation in the vicinity of 3.8 V, and an oxidation peak with a steep slope occurred after 4.5 V.

The peak means the polymer electrolyte being oxidized. In other words, it was seen that the solid polymer electrolyte of Comparative Example 2 formed only with polyethylene oxide was oxidized after 3.8 V, and rapid decomposition occurred in the solid polymer electrolyte from the vicinity of 4.5 V. Meanwhile, the solid polymer electrolyte of Example 13 started to be oxidized after 4.3 V and had a gradual peak until 5 V, and it was seen that electrochemical stability and voltage safety were excellent compared to the solid polymer electrolyte of Comparative Example 2.

Experimental Example 2. Measurement of Lithium Cation Transference Number

Each of the solid polymer electrolytes prepared in Example 14 and Comparative Example 3 was temperature stabilized for 30 minutes in a 25° C. chamber using a VMP3 multichannel potentiostat of Bio-logic Science Instruments, then a lithium cation transference number ($t_{Li}^+$) was measured at 25° C., and some of the results are shown in the following Table 1.

The lithium cation transference number may be calculated using the following Equation 1, and the results are shown in the following Table 1. As for values required for calculating the lithium cation transference number, initial impedance for a lithium symmetric cell or a SUS symmetric cell, impedance after a current decay reached a certain state, and a current decay decreasing by time with respect to an applied voltage were measured and used (Electrochimica Acta 93 (2013) 254).

Herein, the impedance was measured under the condition of Experimental Example 1, and as for the current decay decrease, the current decay being constantly maintained after 10 hours was identified through monitoring a current decrease under a 10 mV voltage. Accordingly, the impedance reaching a certain state was measuring impedance of the cell after applying a 10 mV voltage for 10 hours.

$$t_{Li^+} = \frac{i_{ss}(\Delta V - i_0 R^0)}{i_0(\Delta V - i_{ss} R^{ss})} \quad \text{[Equation 1]}$$

In Equation 1, $\Delta V$ is a change in the voltage applied (10 mV), $i_o$ is an initial current, $i_{ss}$ is a steady state current, $R^0$ is initial resistance and $R^{ss}$ is steady state resistance.

Next, the lithium cation transference numbers of the solid polymer electrolytes of Example 14 and Comparative Example 3 calculated from Equation 1 are shown in the following Table 1.

TABLE 1

| | $\Delta V$ (V) | $R^0$ (kΩ) | $R^{ss}$ (kΩ) | $i_o$ (μA) | $i_{SS}$ (μA) | Lithium Cation Transference Number ($tLi^+$) |
|---|---|---|---|---|---|---|
| Example 14 | 0.01 | 7.165 | 7.738 | 1.08 | 0.793 | 0.43 |
| Comparative Example 3 | 0.01 | 10.895 | 12.549 | 0.722 | 0.475 | 0.34 |

When referring to Table 1, it was seen that the solid polymer electrolyte of Example 14 had an enhanced lithium cation transference number compared to the solid polymer electrolyte of Comparative Example 3.

The invention claimed is:

1. A solid polymer electrolyte comprising a polymer including a first repeating unit represented by the following Chemical Formula 1:

[Chemical Formula 1]

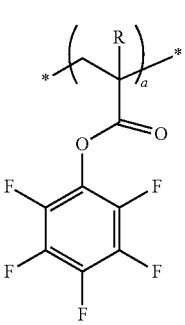

wherein, in Chemical Formula 1,

R is hydrogen or an alkyl group having 1 to 3 carbon atoms; and a is an integer of any one of 1 to 800, wherein the polymer further includes at least one or more of a second repeating unit represented by the following Chemical Formula 2a and a third repeating unit represented by Chemical Formula 2b:

[Chemical Formula 2a]

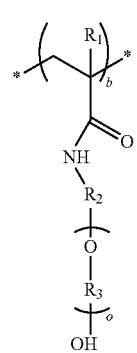

in Chemical Formula 2a,
$R_1$ is hydrogen or an alkyl group having 1 to 3 carbon atoms;
$R_2$ and $R_3$ are each independently an alkylene group having 1 to 3 carbon atoms;
b is an integer of any one of 1 to 800; and
o is an integer of any one of 10 to 100,

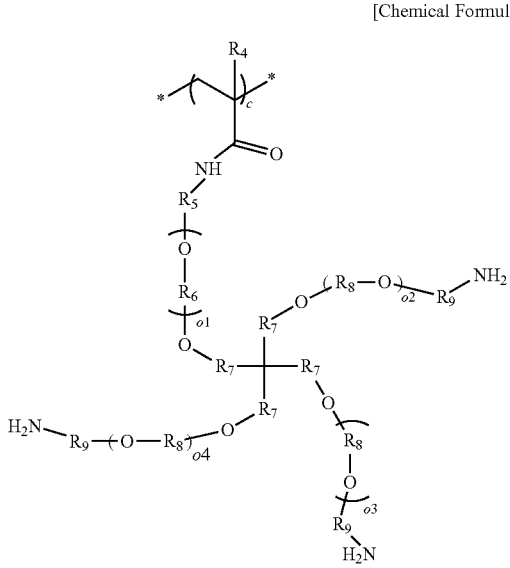

[Chemical Formula 2b]

in Chemical Formula 2b,
$R_4$ is or an alkyl group having 1 to 3 carbon atoms;
$R_5$ to $R_9$ are each independently an alkylene group having 1 to 3 carbon atoms;
c is an integer of any one of 1 to 800; and
$o_1$ to $o_4$ are each independently an integer of any one of 1 to 120.

2. The solid polymer electrolyte of claim 1, wherein, in Chemical Formula 1, a is an integer of any one of 100 to 150.

3. The solid polymer electrolyte of claim 1, wherein, in Chemical Formula 2a and Chemical Formula 2b,
b and c are each independently an integer of any one of 50 to 300; and
$o_1$ to $o_4$ are each independently an integer of any one of 10 to 100.

4. The solid polymer electrolyte of claim 1, wherein the polymer includes a repeating unit represented by the following Chemical Formula 3a:

[Chemical Formula 3a]

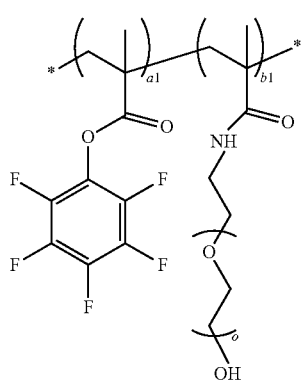

in Chemical Formula 3a,
a1 is an integer of any one of 1 to 800;
b1 is an integer of any one of 1 to 800; and
o is an integer of any one of 10 to 100.

5. The solid polymer electrolyte of claim 1, wherein the polymer includes a repeating unit represented by the following Chemical Formula 3b:

[Chemical Formula 3b]

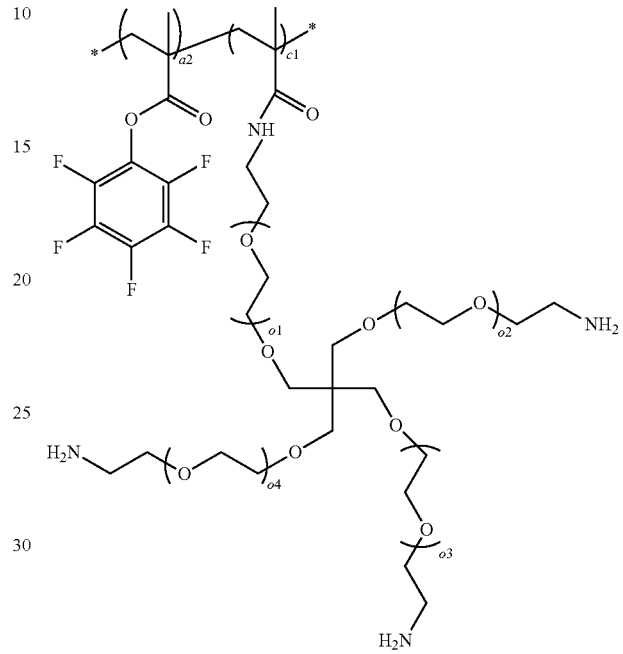

in Chemical Formula 3b,
a2 is an integer of any one of 1 to 800;
c1 is an integer of any one of 1 to 800; and
$o_1$ to $o_4$ are each independently an integer of any one of 1 to 120.

6. The solid polymer electrolyte of claim 1, wherein the polymer includes a repeating unit represented by the following Chemical Formula 3c:

[Chemical Formula 3c]

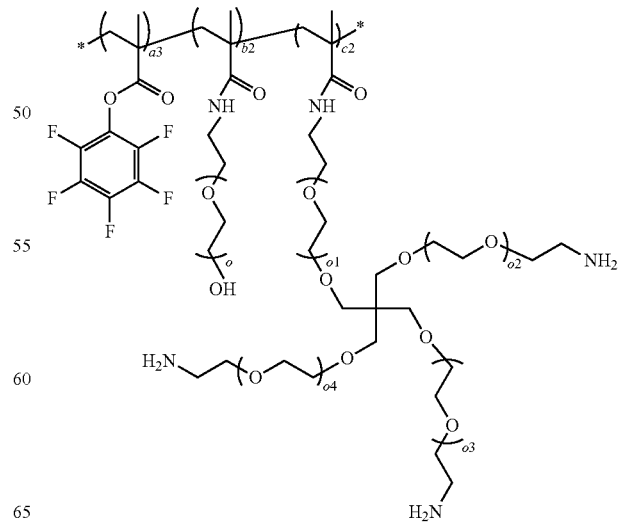

in Chemical Formula 3c, a3 is an integer of any one of 1 to 800;

b2 is an integer of any one of 1 to 800;

c2 is an integer of any one of 1 to 800, o is an integer of any one of 10 to 100; and $o_1$ to $o_4$ are each independently an integer of any one of 1 to 120.

7. The solid polymer electrolyte of claim 1, wherein the polymer further includes a fourth repeating unit represented by the following Chemical Formula 4:

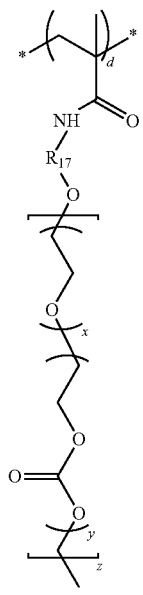

[Chemical Formula 4]

in Chemical Formula 4, $R_{17}$ is an alkylene group having 1 to 5 carbon atoms;

d is an integer of any one of 1 to 800;

x and y are each independently an integer of any one of 1 to 120; and z is an integer of any one of 1 to 10.

8. The solid polymer electrolyte of claim 1, wherein the polymer has a weight average molecular weight (Mw) of 250 to 4,000,000.

9. The solid polymer electrolyte of claim 8, wherein the polymer has a weight average molecular weight (Mw) of 40,000 to 3,000,000.

10. The solid polymer electrolyte of claim 9, wherein the polymer has a weight average molecular weight (Mw) of 60,000 to 500,000.

11. The solid polymer electrolyte of claim 1, further comprising a lithium salt.

12. The solid polymer electrolyte of claim 11, wherein the lithium salt is included in 10% by weight to 50% by weight based on a total weight of the solid polymer electrolyte.

13. The solid polymer electrolyte of claim 3, which has ion conductivity (a) of $5\times10^{-5}$ S/cm to $5\times10^{-4}$ S/cm in a temperature range of 25° C. to 40° C.

14. A lithium secondary battery comprising:

a positive electrode;

a negative electrode; and the solid polymer electrolyte of claim 1 provided between the positive electrode and the negative electrode.

15. The lithium secondary battery of claim 14, further comprising a separator.

* * * * *